(12) United States Patent
Li

(10) Patent No.: US 8,930,608 B2
(45) Date of Patent: Jan. 6, 2015

(54) SWITCH DISK ARRAY, STORAGE SYSTEM AND DATA STORAGE PATH SWITCHING METHOD

(71) Applicant: Huawei Technologies Co., Ltd., Shenzhen (CN)

(72) Inventor: Xuhui Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 82 days.

(21) Appl. No.: 13/622,908

(22) Filed: Sep. 19, 2012

(65) Prior Publication Data

US 2013/0173839 A1    Jul. 4, 2013

(30) Foreign Application Priority Data

Dec. 31, 2011    (CN) .......................... 2011 1 0459979
Feb. 29, 2012    (CN) .......................... 2012 1 0049908

(51) Int. Cl.
    *G06F 13/14*    (2006.01)
(52) U.S. Cl.
    USPC .......................................... 710/305; 710/306
(58) Field of Classification Search
    USPC .................................................. 710/305, 306
    See application file for complete search history.

(56) References Cited

U.S. PATENT DOCUMENTS

| | | | |
|---|---|---|---|
| 6,625,747 B1 | 9/2003 | Tawil | |
| 6,792,511 B2 | 9/2004 | Hameed | |
| 6,941,396 B1* | 9/2005 | Thorpe et al. | 710/74 |
| 7,062,594 B1* | 6/2006 | Sardella et al. | 710/314 |
| 7,467,191 B1 | 12/2008 | Wang et al. | |
| 7,676,625 B2* | 3/2010 | Cassiday et al. | 710/316 |
| 2003/0065841 A1* | 4/2003 | Pecone | 710/105 |
| 2003/0126347 A1* | 7/2003 | Tan et al. | 710/313 |
| 2005/0226148 A1* | 10/2005 | Assarpour | 370/229 |
| 2006/0136688 A1 | 6/2006 | Pang | |
| 2006/0259650 A1 | 11/2006 | Chou et al. | |
| 2010/0257301 A1* | 10/2010 | Kloeppner et al. | 710/313 |
| 2011/0167189 A1* | 7/2011 | Matsubara et al. | 710/308 |
| 2011/0238909 A1 | 9/2011 | Kumar | |

(Continued)

FOREIGN PATENT DOCUMENTS

| | | |
|---|---|---|
| CN | 101217402 A | 7/2008 |
| CN | 101414283 A | 4/2009 |

(Continued)

OTHER PUBLICATIONS

An Introduction to PCI Express, Budruk, Mindshare, undated.*

(Continued)

*Primary Examiner* — Khanh Dang
(74) *Attorney, Agent, or Firm* — Huawei Technologies Co., Ltd.

(57) ABSTRACT

A disk array for a storage system that includes a dual controller disk array and a server includes a disk frame and two controller nodes. Each controller node includes a switch, where a port of the switch is connected to a port of a switch of a peer controller node. Each controller node is configured to detect whether the peer controller node is invalid through the port. When it has been detected that the peer controller node is invalid, a local controller node enables the peer controller node to send, through the port of the switch of the peer controller node, received data from the server to a port of a switch of the local controller node.

9 Claims, 5 Drawing Sheets

(56) References Cited

U.S. PATENT DOCUMENTS

| | | |
|---|---|---|
| 2011/0246460 A1 | 10/2011 | Hsieh et al. |
| 2012/0096192 A1* | 4/2012 | Tanaka et al. ............... 710/20 |
| 2012/0166699 A1* | 6/2012 | Kumar et al. ............... 710/306 |
| 2012/0297135 A1* | 11/2012 | Mathew et al. ............... 711/114 |

FOREIGN PATENT DOCUMENTS

| | | |
|---|---|---|
| CN | 101465769 A | 6/2009 |
| CN | 101488077 A | 7/2009 |
| CN | 101576805 A | 11/2009 |
| CN | 101576806 A | 11/2009 |
| CN | 101834796 A | 9/2010 |
| CN | 102200889 A | 9/2011 |
| CN | 102209103 A | 10/2011 |
| CN | 102629225 A | 8/2012 |
| EP | 2182443 A1 | 5/2010 |

OTHER PUBLICATIONS

PCI Express Peer-to-Peer Interconnect, GE Intelligent Platforms, 2011.*

International Search Report issued in corresponding PCT Patent Application No. PCT/CN2012/081178, mailed Dec. 20, 2012.

Extended European Search Report issued in corresponding European Patent Application No. 12187557.9, mailed Apr. 19, 2013.

Chinese Office Action and Search Report, dated Aug. 21, 2013, for CN Appl. No. 201210049908.2, 9 pages. Partially Translated.

* cited by examiner

SWITCH DISK ARRAY, STORAGE SYSTEM AND DATA STORAGE PATH SWITCHING METHOD

CROSS-REFERENCE TO RELATED APPLICATIONS

This application claims priority to Chinese Patent Application No. 201110459979.5, filed on Dec. 31, 2011 and Chinese Patent Application No. 201210049908.2, filed on Feb. 29, 2012, all of which are hereby incorporated by reference in their entireties.

FIELD OF THE APPLICATION

The present application relates to the field of data storage technologies, and in particular, to a switch disk array, a storage system, and a data storage path switching method.

BACKGROUND OF THE APPLICATION

A storage device usually refers to a disk array, is one or multiple disk devices which are used to store data and independent of a server, and includes a disk frame and multiple controller nodes. A current mainstream disk array uses a dual controller disk array. As shown in FIG. 1, the dual controller disk array includes two controller nodes and a disk frame, which is used for installation of a physical storage medium (for example, a solid state disk). Data in a server is stored in the disk frame through one controller node.

In an actual application, when one controller node in the dual controller disk array is invalid, the other controller node has to be capable of taking over data of the invalid controller node. In order to achieve the foregoing objective, a technical solution is proposed at present. In the solution, after a certain controller node is invalid, multi-path software running on the server detects a link state, and an invalid path (a data path 1 shown in a thin solid line in FIG. 1) is switched to a backup path (a data path 2 shown in a dotted line in FIG. 1), that is, the server switches a data transmission path of the invalid controller node to the other controller node, and re-sends data to be stored to the other controller node.

Although in the foregoing solution, a case that a certain controller node is invalid can be solved, the following problems exist: installing multi-path software provided by a storage device manufacturer in the server and using the software to perform path switching need to be implemented by performing a series of complicated configuration on the server and the disk array in advance, thereby increasing a redundant data amount of the server and the disk array.

SUMMARY OF THE APPLICATION

The embodiments below aim to provide a switch disk array, a storage system, and a data storage path switching method, so as to overcome a disadvantage that, when a server applies multi-path software to switch an invalid controller node, the server and a switch disk array need to add a series of complicated configuration to use the multi-path software.

In order to achieve the foregoing objective, the embodiments provide the following technical solutions:

A data storage path switching method, applied to a storage system including a disk array and a server, where the disk array includes one or more disk frames and two controller nodes, each controller node includes a switch; and the method includes:

detecting, by a first controller node, whether a second controller node is invalid through a first switch of the first controller node connected to a second switch of the second node controller;

resetting, by the first controller node, configuration parameters of the local controller node and the second controller node, when it is detected that the second controller node is invalid;

receiving, by the first controller node, data that is forwarded by the second controller node according to the reset configuration parameters of the second controller node, where the data is sent by the server to the second controller node; and sending, by the first controller node, the data sent by the second controller node to the one or more disk frames to be stored according to the reset configuration parameters of the first controller node.

A data storage path switching method, applied to a storage system including a disk array and a server, where the disk array includes one or more disk frames and two controller nodes, each controller node includes a switch; and the method includes:

receiving, by a second controller node, a reset message sent by a first controller node when the second controller node is invalid, where the first controller node detects whether the second controller node is invalid through a first switch of the first controller node connected to a second switch of the second node controller, and sends the reset message to reset configuration parameters of the local controller node and the second controller node, when it is detected that the second controller node is invalid; and forwarding, by the second controller node, data sent by the server to the first controller node according to the reset configuration parameters of the second controller node, where the first controller node sends the data sent by the second controller node to the one or more disk frames to be stored according to the reset configuration parameters of the first controller node.

A disk array, applied to a storage system including a disk array and a server, where the disk array includes one or more disk frames and two controller nodes, each controller node includes a switch, a first switch of a first controller node is connected to a second switch of a second node controller; where the first controller node is configured to detect whether the second controller node is invalid through the first switch and the second switch, reset configuration parameters of the local controller node and the second controller node when it is detected that the second controller node is invalid, receive data that is forwarded by the second controller node according to the reset configuration parameters of the second controller node, and the data sent by the second controller node to the one or more disk frames to be stored according to the reset configuration parameters of the first controller node.

The foregoing switch disk array, storage system and data storage path switching method may bring the following beneficial effects.

The server only needs to send data to any one controller node in the switch disk array once. If a controller node receiving the data is invalid, a peer node receives the data. The controller nodes detect whether each other is invalid. Therefore, a redundant data path does not need to be set in advance, and the server may implement switching a data transmission path to the peer controller node without the need of installing the multi-path software, thereby reducing a redundant data amount of the server and the switch disk array.

BRIEF DESCRIPTION OF THE DRAWINGS

To illustrate the technical solutions in the embodiments or in the prior art more clearly, accompanying drawings required for describing the embodiments or the prior art are briefly introduced in the following. Apparently, the accompanying drawings in the following description are merely some embodiments, and persons of ordinary skill in the art may further obtain other drawings according to the accompanying drawings without creative efforts.

DETAILED DESCRIPTION OF THE EMBODIMENTS

The embodiments described below are best understood with reference to the accompanying drawings. The embodiments are exemplary. Other embodiments may be derived from those disclosed and are understood to fall within the scope of protection of the claims.

For reference and clarity, acronyms or abbreviations or Chinese and English versions of devices used in the following are summarized as follows:

PCIE: Peripheral Component Interconnect Express, peripheral component interconnect express;
PCIE end point device: PCIE End Point;
PCIE switch: PCIE Switch Device;
CPU: Central Processing Unit, central processing unit;
NTB: Non-Transparent Bridge, non-transparent bridge;
upstream port: upstream port; and
downstream port: downstream port.

Embodiment 1

Figure 1:
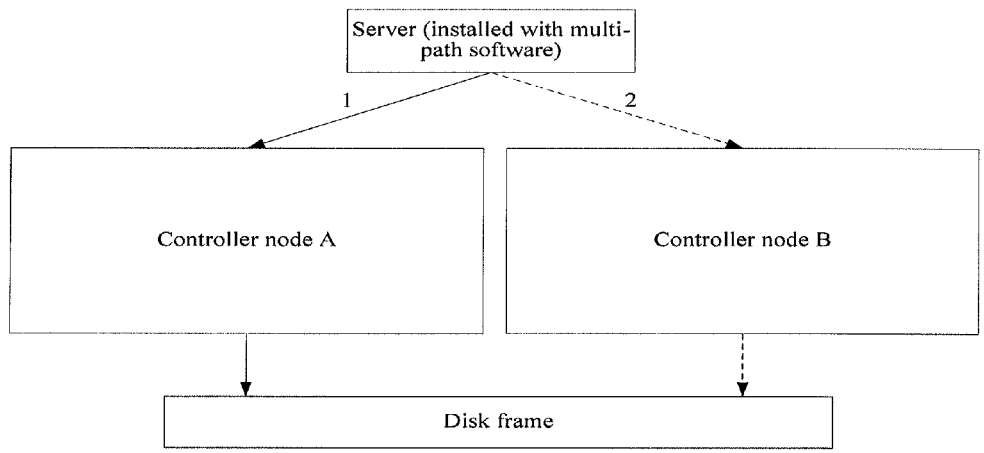
FIG. 1 is schematic diagram of a data storage path switching method in the prior art.
Figure 2:
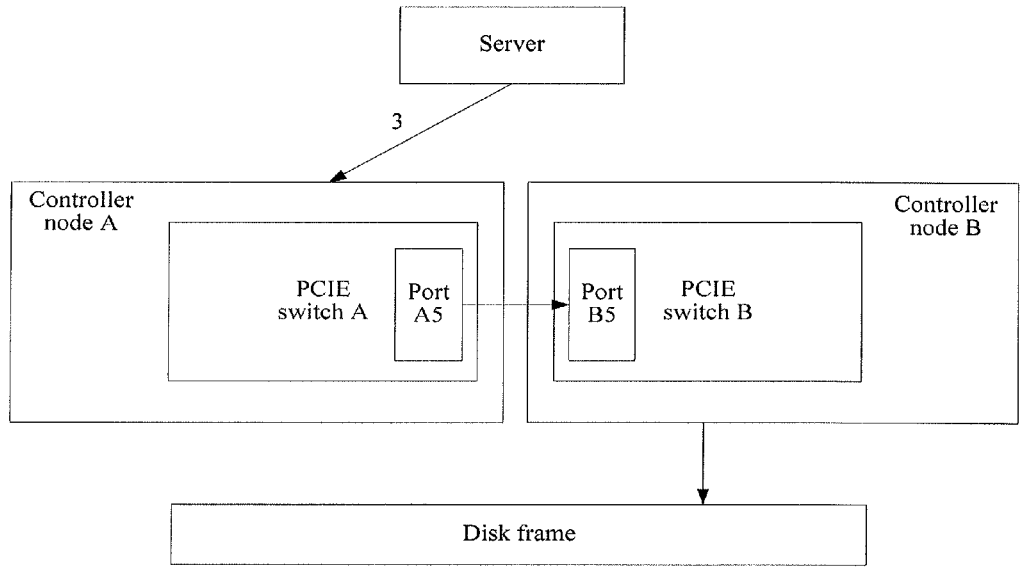
FIG. 2 is a first schematic structural diagram of a dual controller disk array and a server according to Embodiment 1.

Referring to FIG. 2, a schematic structural diagram of a dual controller disk array and a schematic connection diagram of the dual controller disk array and a server according to this embodiment are shown.

The dual controller disk array includes a disk frame and two controller nodes. Each controller node includes a switch, where a port of the switch is connected to a port of a switch of a peer controller node. Each controller node receives, through a switch of a local controller node, data sent by the server, and stores the data in the disk frame.

For ease of description, two controller nodes in the dual controller disk array are referred to as a controller node A and a controller node B. Functions of the controller node A and the controller node B are similar, and the controller node A may be an active/standby controller node of the controller node B and the controller node B may be an active/standby controller node of the controller node A. The server or the disk array may select, according to a certain selection policy, one controller node to transmit data to be stored to the disk frame. The controller node A includes a switch A, and the controller node B includes a switch B. Both the controller node A and the controller node B may receive, through the switch of the local controller node, data sent by the server, and store the data in the disk frame.

A port A5 of the switch A is connected to a port B5 of the switch B. Each controller node detects whether the peer controller node is invalid through the port of the switch of the local controller node; when it has been detected that the peer controller node is invalid, resets configuration parameters of the local controller node and the peer controller node, so that the peer controller node sends, through the port which is of the switch of the peer controller node and connected to the local controller node, the received data sent by the server to a port of the switch of the local controller node; receives, through the port of the switch of the local controller node, the data sent by the peer controller node, where the data is sent to the peer controller node by the server; and stores the received data in the disk frame. For example, in a process that the controller node A receives the data sent by the server and stores the data in the disk frame, the controller node B detects whether the controller node A is invalid through the port B5; when it has been detected that the controller node A is invalid, resets configuration parameters of the controller node A and the controller node B, so that the controller node A sends, through the port A5, the received data sent by the server to the port B5; and stores the data received in the port B5 in the disk frame.

Optionally, a manner for detecting, by the controller node, whether the peer controller node is invalid includes, but is not limited to:

The controller node judges whether the port which is of the switch of the local controller node and connected to the peer controller node receives a handshake message sent by the peer controller node in a preset time period; and if a judgment result is no, determines that the peer controller node is invalid. For example, the controller node B judges whether the port B5 receives a handshake message sent by the port A5 in 10 seconds, and if the handshake message is not received, determines that the peer controller node is invalid. When the preset time period (that is, a time interval for monitoring the handshake message) is set, in a range allowed by a system, factors such as processing performance of the controller node and a real-time requirement of a user for data transmission may be jointly considered. If the processing performance of the controller node is high and the real-time requirement of the user is high, the time interval for monitoring the handshake message may be set to be short, and on the contrary, may be prolonged properly.

Certainly, other manners may also be adopted to detect whether the peer controller node is invalid. For example, the controller node B sends a probe message to the controller node A in a preset time interval, judges whether a response message fed back by the controller node A can be received, and if the response message is not received when the preset time period expires, determines that the controller node A is invalid. Alternatively, two controller nodes agree in advance that, when receiving an interruption message sent by the peer controller node, each controller node confirms that the peer controller node is invalid.

Correspondingly, each controller node in the dual controller disk array shown in FIG. 2 is further configured to periodically send a handshake message to the peer controller node, and a time interval in the period is not greater than the preset time period used when it is determined whether invalidation occurs.

The foregoing dual controller disk array may bring the following beneficial effects.

The server only needs to send data to any one controller node in the dual controller disk array once, and if a controller node receiving the data is invalid, the peer controller node receives the data, that is, the server in this embodiment sends the data to the controller node A once, and when the controller node A is invalid, the controller node B actively takes over the data.

In this embodiment, the controller nodes detect whether each other is invalid, and therefore, a redundant data path does not need to be set in advance, and the server may implement switching a data transmission path to the peer controller node without applying multi-path software, thereby avoiding the cost for additionally purchasing the multi-path software, and avoiding a problem of incompatibility between multi-path software provided by each existing storage device manufacturer.

Because the multi-path software does not need to be installed in the server, the server and the dual controller disk array do not need to add configuration to use the multi-path software, thereby reducing a redundant data amount of the server and the dual controller disk array.

Embodiment 2

Figure 3:
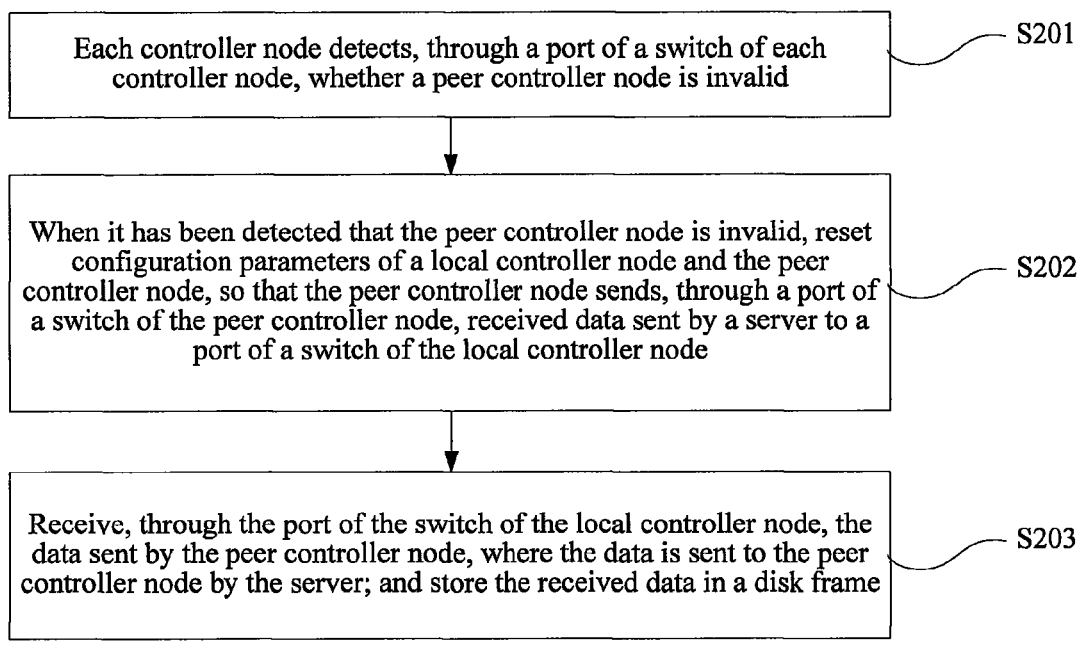
FIG. 3 is a first flow chart of a data storage path switching method according to Embodiment 2.

Referring to FIG. 3, this embodiment provides a data storage path switching method, and each controller node in FIG. 2 may implement data storage path switching by adopting the method.

In this embodiment, it is taken as an example that a controller node A is invalid and a controller node B takes over data on the invalid controller node A.

Step 201: Each controller node detects, through a port, which is of a switch of each controller node and connected to a peer controller node, whether the peer controller node is invalid.

The controller node B detects whether the controller node A is invalid through a port B5. A manner for detecting, by the controller node B, whether the controller node A is invalid includes, but is not limited to:

The controller node B judges whether a port B5 of a switch of a local controller node receives a handshake message sent by the controller node A in a preset time period; and if a judgment result is no, determines that the controller node A is invalid. For example, the controller node B judges whether the port B5 receives a handshake message sent by a port A5 in 10 seconds, and if the handshake message is not received, determines that the peer controller node is invalid. When the preset time period (that is, a time interval for monitoring the handshake message) is set, in a range allowed by a system, factors such as processing performance of the controller node and a real-time requirement of a user for data transmission may be jointly considered. If the processing performance of the controller node is high and the real-time requirement of the user is high, the time interval for monitoring the handshake message may be set to be short, and on the contrary, may be prolonged properly.

Certainly, other manners may also be adopted to detect whether the peer controller node is invalid. For example, the controller node B sends a probe message to the controller node A in a preset time interval, judges whether a response message fed back by the controller node A can be received, and if the response message is not received when the preset time period expires, determines that the controller node A is invalid.

Correspondingly, the controller node B is further configured to periodically send a handshake message to the controller node A, and a time interval in the period is not greater than the preset time period used when it is determined whether invalidation occurs.

Step 202: When it has been detected that the peer controller node is invalid, reset configuration parameters of the local controller node and the peer controller node, so that the peer controller node sends, through a port of a switch of the peer controller node, received data sent by a server to the port of the switch of the local controller node.

As shown in FIG. 2, the dual controller disk array includes a disk frame and two controller nodes, which are a controller node A and a controller node B. Each controller node may receive, through the switch of the local controller node, the data sent by the server, and store the data in the disk frame. Each controller node includes a switch, where a port A5 of a switch A is connected to a port B5 of a switch B.

In a process that the controller node A receives the data sent by the server and stores the data in the disk frame, the controller node B detects whether the controller node A is invalid through the port B5, and when it has been detected that the controller node A is invalid, resets configuration parameters of the controller node A and the controller node B, so that the controller node A sends, through the port A5, the received data sent by the server to the port B5.

Step 203: Receive, through the port of the switch of the local controller node, the data sent by the peer controller node, and store the received data in the disk frame, where the data is sent to the peer controller node by the server.

The port B5 of the controller node B receives the data sent by the controller node A, and stores the received data in the disk frame.

The foregoing data storage path switching method may bring the following beneficial effects.

The server only needs to send data to any one controller node in the dual controller disk array once. If a controller node receiving the data is invalid, the peer node receives the data. In the embodiment, the controller nodes detect whether each other is invalid. Therefore, a redundant data path does not need to be set in advance, and the server may implement switching a data transmission path to the peer controller node without applying multi-path software, thereby avoiding the cost of additionally purchasing the multi-path software. Because the multi-path software does not need to be installed in the server, the server and the dual controller disk array do not need to add configuration to use the multi-path software, thereby reducing redundancy of the server and the dual controller disk array.

Embodiment 3

Figure 4:
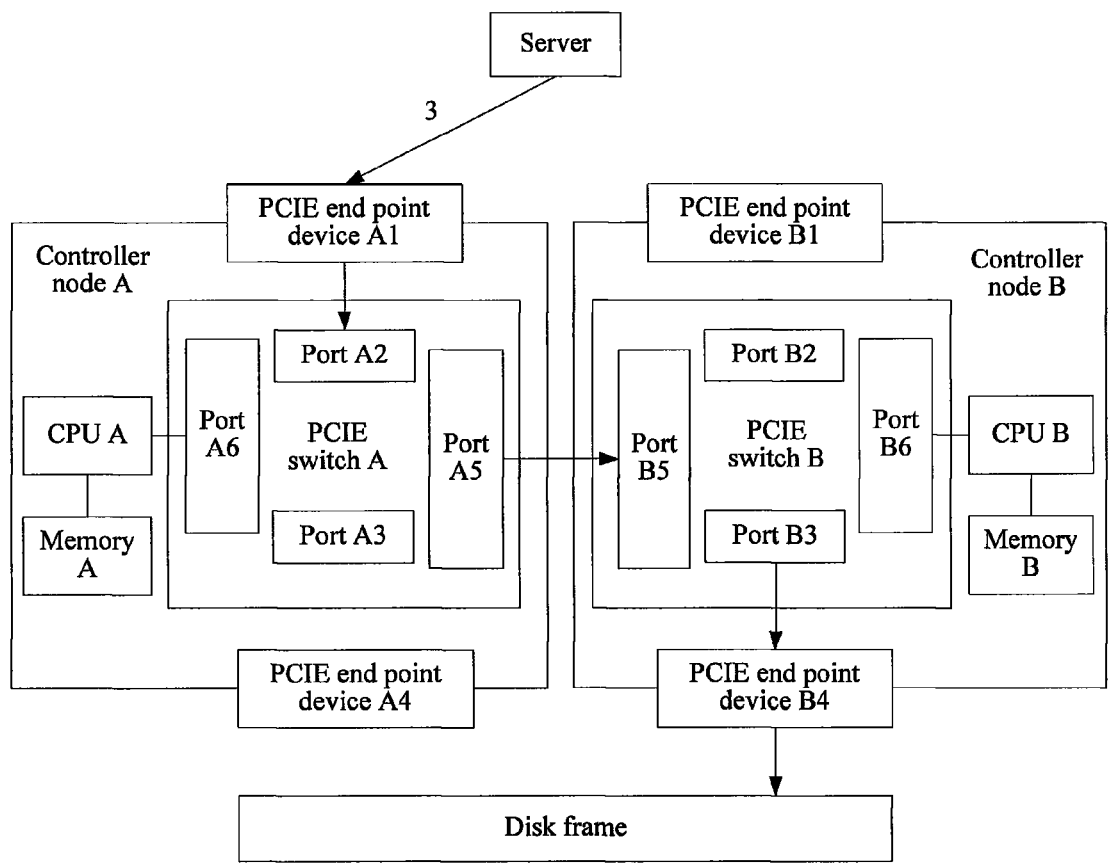
FIG. 4 is a second schematic structural diagram of a dual controller disk array and a server according to Embodiment 3.

An embodiment provides a specific structure of a dual controller disk array in a scenario that both the dual controller disk array and a server support a PCIE bus, as shown in FIG. 4.

Each controller node in FIG. 4 includes a switch (a port of the switch is connected to a port of a switch of a peer controller node), and also includes a first end point device connected to the server, a second end point device connected to a disk frame, and a central processing unit CPU configured to run a read or write control program.

Optionally, the first end point device and the second end point device may be a PCIE end point device, and the switch may be a PCIE switch. Specifically, a controller node A has a PCIE end point device A1 connected to the server, and a PCIE end point device A4 connected to the disk frame. The controller node A also has a PCIE switch A, a CPU A configured to run the read or write control program, and a memory A. The PCIE switch A has multiple ports, which are a port A2, a port A3, a port A5, and a port A6. The PCIE end point device A1 is connected to the port A2. The port A3 is connected to the PCIE end point device A4, and transmits, through the PCIE end point device A4, data delivered by the server to the disk frame. The memory A is connected to the port A6 of the PCIE switch A through the central processing unit A.

A controller node B also has a PCIE end point device B1 connected to the server, a PCIE end point device B4 connected to the disk frame, a PCIE switch B, a CPU B, and a memory B, where the PCIE switch B has a port B2, a port B3, a port B5, and a port B6. Its structure is the same as that of the controller node A, and is not repeatedly described here.

In the dual controller disk array, the controller node A is connected to the controller node B through the port A5 and the port B5. Optionally, the port A5 and the port B5 may be PCIE non-transparent bridge ports.

In the dual controller disk array shown in FIG. 2, a storage process of data to be stored is that: The first end point device in each controller node receives data sent by the server, and sends the data to a switch of a local controller node; and the CPU in the controller node sends the data in the switch to the second end point device which is in the local controller node according to a configuration parameter in configuration space of the switch, and the second end point device sends the data to the disk frame.

Specifically, when the controller node A acts, the PCIE end point device A1 in the controller node A receives the data sent by the server, and sends the data to the PCIE switch A which is in the local controller node. The CPU A in the controller node A sends the data in the PCIE switch A to the PCIE end point device A4 which is in the local controller node according to a configuration parameter in configuration space of the PCIE switch A, and the PCIE end point device A4 sends the data to the disk frame. Similarly, a process that the controller node B receives data sent by the server and stores the data in the disk frame is the same as the process that the controller node A receives the data sent by the server and stores the data in the disk frame, and is not repeatedly described here.

Each controller node in the dual controller disk array is further configured to detect, through a port which is of a switch of each controller node and connected to the peer controller node, whether the peer controller node is invalid; when it has been detected that the peer controller node is invalid, reset configuration parameters of the local controller node and the peer controller node, so that the peer controller node sends, through the port of the switch of the peer controller node, the received data sent by the server to the port of the switch of the local controller node; receive, through the port of the switch of the local controller node, the data sent by the peer controller node, where the data is sent to the peer controller node by the server; and store the received data in the disk frame. Specifically, the controller node B may be configured to detect whether the controller node A is invalid through the port B5, and when it has been detected that the controller node A is invalid, the controller node B resets configuration parameters of the local controller node and the controller node A, so that the controller node A sends, through the port A5 of the PCIE switch A of the controller node A, the received data sent by the server to the port B5 of the PCIE switch B. The controller node B receives, through the port B5 which is in the PCIE switch B of the local controller node, the data sent by the controller node A, where the data is sent to the controller node A by the server; and stores the received data in the disk frame.

For a data transmission path in this embodiment, reference may be made to an arrow direction in FIG. 2. The data sent by the server is stored, through a data path 3, in the disk frame.

A process of resetting the configuration parameters is described in detail in the following.

The controller node configures a port which is of the switch of the local controller node and connected to the peer controller node to an upstream port, and configures, through the port, a port which is of the switch of the peer controller node and connected to the node to a downstream port, where the upstream port and the downstream port are port attributes defined in a PCIE specification. The upstream port refers to a port near a CPU of a taking-over party, and the downstream port refers to a port away from the CPU of the taking-over party. A port configured to the upstream port can scan a configuration parameter of the downstream port connected to the port, and a port configured to the downstream port cannot scan configuration parameters of other connected ports. The controller node device scans configuration space of the peer controller node through the port, which is of the switch of the local controller node and connected to the peer controller node, so as to acquire configuration parameters in the configuration space of the switch and the first end point device of the peer controller node. Configuration parameters of the switch, the end point device, and the CPU in the local controller node are stored in the configuration space, where the configuration parameters may be running parameters of the switch, the end point device, and the CPU. The configuration parameters of the switch and the first end point device of the peer controller node are reset, so that after the first end point device of the peer controller node sends the received data to the switch of the peer controller node, the data is sent to the port of the switch of the local controller node through the port which is of the switch of the peer controller node and connected to the local controller. The switch of the local controller node sends the data received by the port to the second end point device of the local controller node.

By setting the configuration parameters of the ports, the ports in the PCIE switches may be set to the upstream port and the downstream port.

According to a PCIE protocol specification: The upstream port can scan and find all PCIE end point devices and a switch that are connected to the downstream port, and perform unified addressing and routing access. A PCIE non-transparent bridge port may implement isolation, that is to say, isolate devices at two sides of the PCIE non-transparent bridge port so that the devices cannot scan and find each other. An attribute of the port can be modified by setting a configuration parameter of the port. Therefore, the foregoing ports in the controller node A are set to a downstream port A5, a downstream port A6, a downstream port A2, and a downstream port A3. The foregoing ports in the controller node B are set to an upstream port B5, an upstream port B6, a downstream port B2, and a downstream port B3.

After the upstream port B5 of the controller node B is connected to the downstream port A5 of the controller node A, a CPU B connected to the upstream port B6 of the controller node B may scan the PCIE switch A of the controller node A and all the PCIE end point devices in the controller node A.

Specifically, as shown in FIG. 3, it is taken as an example that the controller node A is invalid or faulty, the resetting the configuration parameters of the ports of the switches in the controller node B and the controller node A includes: The controller node B configures the port B5 of the PCIE switch B of the local controller node to an upstream port, and configures, through the port B5 of the PCIE switch B of the local controller node, the port A5 of the PCIE switch A in the controller node A to a downstream port. The controller node B scans the configuration space of the controller node A through the port B5 which is in the PCIE switch B of the local controller node, so as to acquire configuration parameters in the configuration space of the PCIE switch A and the PCIE end point device A1 which are in the controller node A. The configuration parameters in the configuration space of the PCIE switch A and the PCIE end point device A1 which are in the controller node A are reset, so that after the PCIE end point device A1 of the controller node A sends the received data to the PCIE switch A of the controller node A, the data is sent to the port B5 of the PCIE switch B which is in the controller node B through the port A5 of the PCIE switch A in the controller node A. The PCIE switch B in the controller node B sends the data received by the port B5 to the PCIE end point device B1 of the local controller node.

The dual controller disk array provided by this embodiment may bring the following beneficial effects.

The server only needs to send data to any one controller node in the dual controller disk array once, and if a controller node receiving the data is invalid, the peer controller node receives the data, that is, the server in this embodiment sends the data to the controller node A once, and when the controller node A is invalid, the controller node B actively takes over the data.

In this technical solution, a redundant data path does not need to be set in advance, the controller nodes detect whether each other is invalid, so as to implement mutual detection and perform data path switching, and the server may implement switching the data transmission path to the peer controller node without applying multi-path software, thereby avoiding the cost of additionally purchasing the multi-path software. Because the multi-path software does not need to be installed in the server, the server and the dual controller disk array do not need to add configuration to use the multi-path software, thereby reducing redundancy of the server and the dual controller disk array. Moreover, after the controller node A is invalid, some parts (for example, the PCIE end point device A1 shown in FIG. 4) of the controller node A may continuously provide services, thereby avoiding a waste of some available parts.

Embodiment 4

Figure 5:
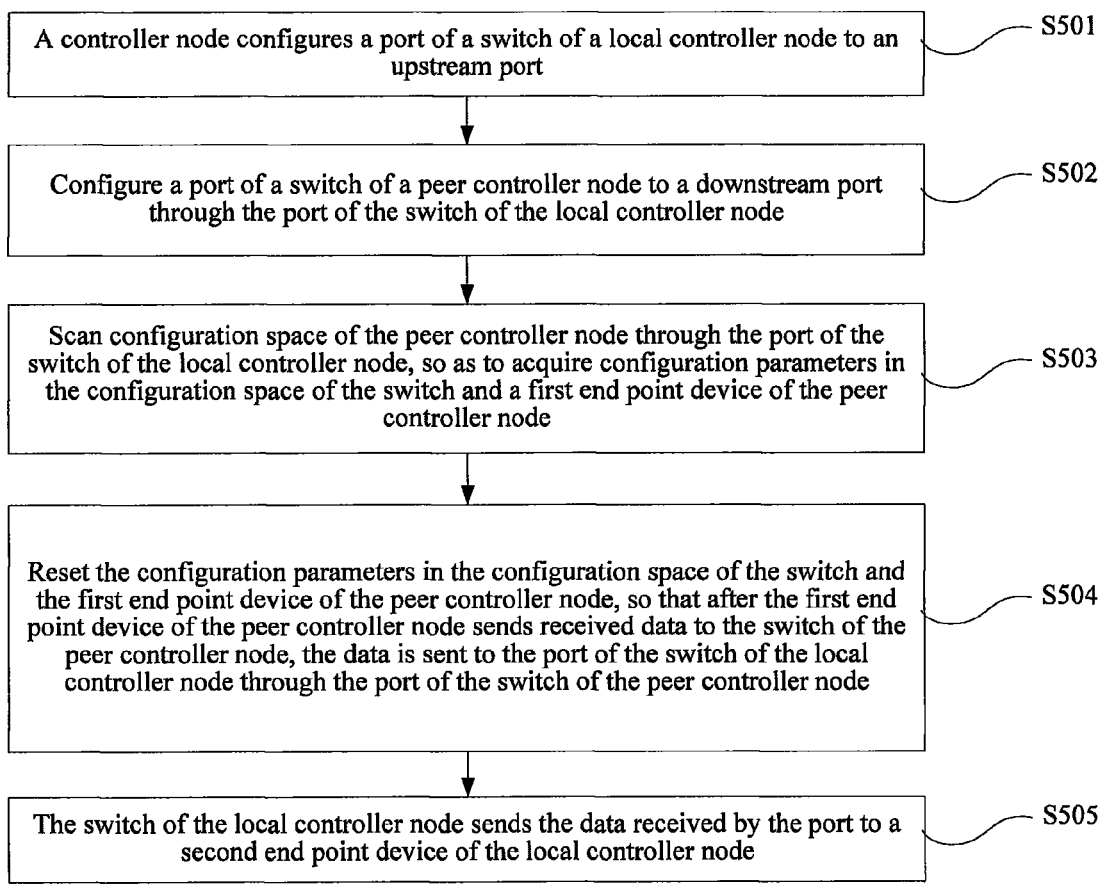
FIG. 5 is a flow chart of a configuration parameter resetting method in a data storage path switching method according to Embodiment 4.

Referring to FIG. 5, an embodiment provides a data storage path switching method in a scenario that both a dual controller disk array and a server support a PCIE bus. Each controller node in FIG. 4 may implement data storage path switching by adopting the method.

In this embodiment, it is still taken as an example that a controller node A is invalid and a controller node B takes over data on the invalid controller node A.

For a specific structure of each controller node in FIG. 4, reference may be made to Embodiment 3, and details are not repeatedly described here. The data storage path switching methods in this embodiment and Embodiment 2 are the same, where the process that "each controller node may receive, through the switch of the local controller node, the data sent by the server, and store the data in the disk frame" in Embodiment 2 specifically is: A first end point device in each controller node receives data sent by the server, and sends the data to a switch of a local controller node; and a CPU in the controller node sends the data in the switch to a second end point device which is in the local controller node according to a configuration parameter in configuration space of the switch, and the second end point device sends the data to a disk frame.

Specifically, when the controller node A acts, a PCIE end point device A1 in the controller node A receives the data sent by the server, and sends the data to a PCIE switch A which is in the local controller node. A CPU A in the controller node A sends the data in the PCIE switch A to a PCIE end point device A4 which is in the local controller node according to a configuration parameter in configuration space of the PCIE switch A, and the PCIE end point device A4 sends the data to the disk frame. Similarly, a process that the controller node B receives data sent by the server and stores the data in the disk frame is the same as the process that the controller node A receives the data sent by the server and stores the data in the disk frame, and is not repeatedly described here.

Referring to FIG. 5, a process of resetting configuration parameters in Embodiment 2 is described in detail in the following.

Step 501: A controller node configures a port, which is of the switch of the local controller node and connected to a peer controller node to an upstream port.

The controller node B configures a port B5 of a PCIE switch B of the local controller node to an upstream port.

Step 502: Configure a connected port of a switch of the peer controller node to a downstream port through the port of the switch of the local controller node.

The controller node B configures a port A5 of the PCIE switch A in the controller node A to a downstream port through the port B5 of the PCIE switch B of the local controller node.

Step 503: Scan configuration space of the peer controller node through the port of the switch of the local controller node, so as to acquire configuration parameters in the configuration space of the switch and a first end point device of the peer controller node.

The controller node B scans configuration space of the controller node A through the port B5 of the PCIE switch B of the local controller node, so as to acquire configuration parameters in the configuration space of the PCIE switch A and the PCIE end point device A1 of the controller node A.

Step 504: Reset the configuration parameters in the configuration space of the switch and the first end point device of the peer controller node, so that after the first end point device of the peer controller node sends the received data to the switch of the peer controller node, the data is sent to the port of the switch of the local controller node through the port of the switch of the peer controller node.

The configuration parameters in the configuration space of the PCIE switch A and the PCIE end point device A1 of the controller node A are reset, so that after the PCIE end point device A1 of the controller node A sends the received data to the PCIE switch A of the controller node A, the data is sent to the port B5 of the PCIE switch B which is in the controller node B through the port A5 of the PCIE switch A in the controller node A.

Step 505: The switch of the local controller node sends the data received by the port to the second end point device of the local controller node.

The PCIE switch B in the controller node B sends the data received by the port B5 to a PCIE end point device B4 of the local controller node.

The data storage path switching method provided by this embodiment may bring the following beneficial effects.

The server only needs to send data to any one controller node in the dual controller disk array once, and if a controller node receiving the data is invalid, the peer controller node receives the data, that is, the server in this embodiment sends the data to the controller node A once, and when the controller node A is invalid, the controller node B actively takes over the data.

In this technical solution, a redundant data path does not need to be set in advance, the controller nodes detect whether each other is invalid, so as to implement mutual detection and perform data path switching, and the server may implement switching a data transmission path to the peer controller node without applying multi-path software, thereby avoiding the cost of additionally purchasing the multi-path software. Because the multi-path software does not need to be installed in the server, the server and the dual controller disk array do not need to add configuration to use the multi-path software, thereby reducing redundancy of the server and the dual controller disk array. After the controller node A is invalid, some parts (for example, the PCIE end point device A1 shown in FIG. 4) of the controller node A may continuously provide services, thereby avoiding a waste of some available parts.

Embodiment 5

Figure 6:
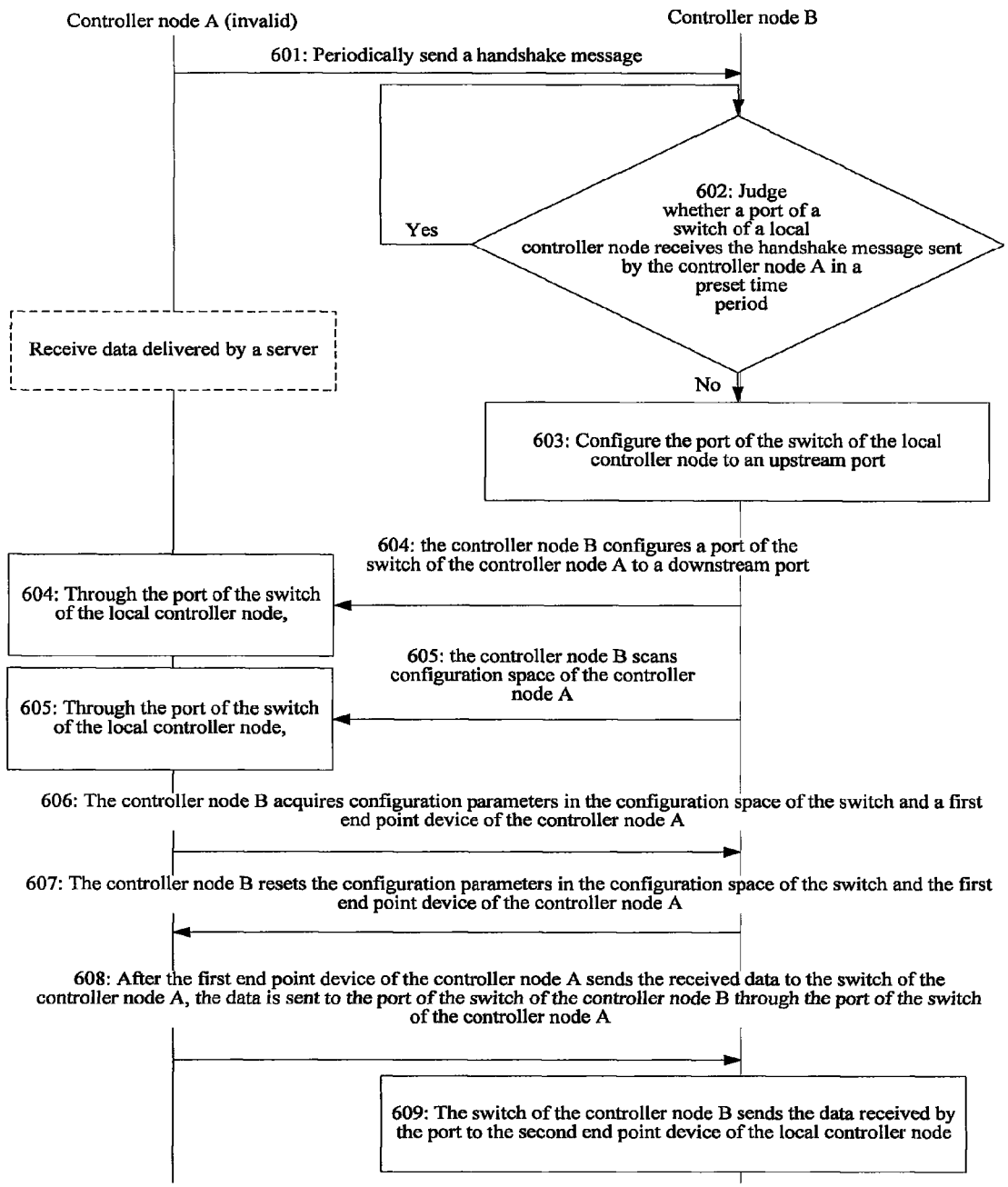
FIG. 6 is a sequence diagram of a data storage path switching method according to Embodiment 5.

Referring to FIG. 6, in order to make this solution clearer, it is described in a sequence diagram manner that, in a dual controller disk array, a controller node A is invalid and a controller node B takes over data on the controller node A.

Referring to the schematic structural diagram of the dual controller disk array and the server in FIG. 4, the controller node A has a PCIE end point device A1 connected to a server, and a PCIE end point device A4 connected to a disk frame. The controller node A also has a PCIE switch A, a central processing unit CPU A configured to run a read or write control program, and a memory A. The PCIE switch A has multiple ports, which are a port A2, a port A3, a port A5, and a port A6. The PCIE end point device A1 is connected to the port A2. The port A3 is connected to the PCIE end point device A4, and transmits, through the PCIE end point device A4, data delivered by the server to the disk frame. The memory A is connected to the port A6 of the PCIE switch A through the central processing unit A.

The controller node B also has a PCIE end point device B1 connected to the server, a PCIE end point device B4 connected to the disk frame, a PCIE switch B, a CPU B, and a memory B, where the PCIE switch B has a port B2, a port B3, a port B5, and a port B6. Its structure is the same as that of the controller node A, and is not repeatedly described here.

The method at least includes the following steps.

Step 601: Periodically send a handshake message.

The controller node A periodically sends a handshake message to the controller node B through the port A5. The foregoing handshake message may be a heartbeat message.

Step 602: Judge whether a port of a switch of a local controller node receives the handshake message sent by the controller node A in a preset time period; if yes, it indicates that a peer controller operates normally, continue monitoring, and repeat this step; otherwise, determine that the peer controller node is invalid, and proceed to step 603.

The controller node B judges whether the port B5 of the PCIE switch B in the local controller node receives the handshake message sent by the controller node A in a preset time period. In this embodiment, the controller node cannot receive the handshake message in the preset time period, so it is judged that the controller node A is invalid.

Step 603: Configure the port, which is of the PCIE switch B of the local controller node and connected to the peer controller node to an upstream port.

The controller node B configures the port B5 of the PCIE switch B of the local controller node to an upstream port.

Step 604: The controller node B configures, through the port which is of the switch of the local controller node and connected to the peer controller node, a port which is of a switch of the controller node A and connected to the port to a downstream port.

Specifically, the controller node B configures the port A5 of the PCIE switch A in the controller node A to a downstream port through the port B5 of the PCIE switch B of the local controller node.

Step 605: The controller node B scans configuration space of the controller node A through the port, which is of the switch of the local controller node and connected to the peer controller node.

Specifically, the controller node B scans the configuration space of the controller node A through the port B5 of the PCIE switch B of the local controller node.

Step 606: The controller node B acquires configuration parameters in the configuration space of the switch and a first end point device of the controller node A.

The controller node B acquires configuration parameters in the configuration space of the PCIE switch A and the PCIE end point device A1 that are in the controller node A.

Step 607: The controller node B resets the configuration parameters in the configuration space of the switch and the first end point device of the controller node A.

The controller node B resets the configuration parameters in the configuration space of the PCIE switch A and the PCIE end point device A1 that are in the controller node A.

A result after resetting is that the controller node A clears running states of the PCIE switch A and the PCIE end point device A1 before invalidation, so that the PCIE switch A and the PCIE end point device A1 re-enter a state during initial power-on. In addition, the PCIE switch A and the PCIE end point device A1 of the controller node A may operate normally in a PCIE domain of the controller node B, that is to say, an effect after resetting is that the PCIE switch A and the PCIE end point device A1 on the controller node A are equivalent to the PCIE switch B and the PCIE end point device B1 on the controller node B. After re-initialization is completed, when receiving data sent by the server, the PCIE end point device A1 directly transfers the data to the controller node B.

Step 608: After the first end point device of the controller node A sends the received data to the switch of the controller node A, the data is sent to the port of the switch of the controller node B through the port which is of the switch of the controller node A and connected to the controller node B.

After the PCIE end point device A1 of the controller node A sends the received data to the PCIE switch A of the controller node A, the data is sent to the port B5 of the PCIE switch B of the controller node B through the port A5 of the PCIE switch A of the controller node A.

Step 609: The switch of the controller node B sends the data received by the port to a second end point device of the local controller node.

The PCIE switch B of the controller node B sends the data received by the port B5 to the PCIE end point device B4 of the local controller node.

It should be noted that, a sequence of the steps of receiving, by the controller node A, data sent by the server is not limited, and it should be understood that, the receiving, by controller node A, the data sent by the server is a random event, which may occur at any time in this solution.

Embodiment 6

The present application further provides a storage system, including a server and a dual controller disk array. The dual controller disk array is the dual controller disk array in any embodiment of the foregoing Embodiment 1 and Embodiment 3. Reference may be specifically made to the structure of the dual controller disk array in Embodiment 1 and Embodiment 3, and details are not repeatedly described here.

The storage system should have the dual controller disk array in the foregoing embodiment, and has beneficial effects of the foregoing dual controller disk array, which are not repeatedly described here.

In all the foregoing embodiments, the detecting whether the peer controller node is invalid through the port includes: each controller node judges whether the port of the switch in the local controller node receives the handshake message sent by the peer controller node in the preset time period; and if a judgment result is not, determines that the peer controller node is invalid.

Specifically, the controller node B judges whether the port B5 of the local controller node receives the handshake message sent by the controller node A in the preset time period; and if a judgment result is no, determines that the controller node A is invalid.

The handshake message may be a heartbeat message, and the heartbeat message may be used to indicate that the controller node still operates normally. For example, in a scenario that both the switch and the end point device in the controller node support a PCIE bus and interconnected ports between the two controller nodes are non-transparent bridge ports, the controller node B may monitor a state of the controller node A, and the controller node A may transmit a heartbeat message to the controller node B through a doorbell register. When the controller node B does not receive a prescribed heartbeat message in a prescribed time period, it is considered that the controller node A is invalid. If the controller node B finds that the controller node A is invalid, the controller node B needs to take some necessary measures, so that that a data transmission path on the controller node A is switched to the controller node B. The doorbell register is configured to transmit an interruption request from one side of a non-transparent bridge to the other side, and for the doorbell register and a doorbell mechanism, reference may be made to relevant technical documents of the non-transparent bridge, and details are not described here.

In all the foregoing embodiments, each controller node is further configured to periodically send the handshake message to the peer controller node, where a time interval in the period is not greater than the preset time period.

In all the foregoing embodiments, the invalidation of the peer controller node includes a failure of the CPU in the peer controller node, and/or a failure of the memory connected to the CPU.

In all the foregoing embodiments, the first end point device and the second end point device include peripheral component interconnect express PCIE end point devices, and the switch includes a PCIE switch.

Through the description of the foregoing method embodiments, persons skilled in the art may clearly understand that the present application may be implemented by means of software and a necessary general hardware platform, and certainly, may also be implemented by means of hardware, but in most cases, the former is a preferred implementation manner. Based on such understanding, the technical solution essentially, or the part that makes contributions to the prior art may be implemented in a form of a software product. The computer software product is stored in a storage medium, and includes several instructions for instructing a computer device (which may be a personal computer, a server, a network device, and so on) to execute all or part of the steps of the methods in the embodiments. The storage medium may include any medium capable of storing program codes, such as a read-only memory (ROM), a random access memory (RAM), a magnetic disk, or an optical disk.

For the apparatus embodiments, because they basically correspond to the method embodiments, reference may be made to part of the description of the method embodiments for relevant content. The apparatus embodiments described above are merely exemplary. The units described as separate parts may or may not be physically separate, and parts shown as units may or may not be physical units, may be located in one position, or may also be distributed on multiple network units. Part of or all of the units may be selected according to actual needs to achieve the objective of the solutions of the embodiments. Persons of ordinary skill in the art may understand and implement the embodiments without creative efforts.

It should be understood that in the several embodiments provided by the present application, the disclosed apparatus and method may be implemented by other means without departing from the spirit and scope of the present application. The present embodiments are merely exemplary examples, and should not be construed as limitations. The given specific content should not limit the objective of the present application. For example, dividing of the units or subunits is merely a type of logical function dividing, and there may be other dividing manners in actual implementation. For example, multiple units or multiple subunits are combined together. In addition, multiple units or components may be combined or may be integrated to multiple apparatus, or some characteristics may be ignored or not executed.

In addition, the schematic diagrams of the described apparatus, method and different embodiments may be combined or integrated with other apparatuses, modules, technologies or methods without departing from the scope. For end points, shown or discussed mutual coupling or direct coupling or communication connection may be implemented through some interfaces. Indirect coupling or communication connection between the apparatuses or units may be electrical, mechanical or in other forms.

The foregoing embodiments are merely exemplar. It is understood that other embodiments may be derived by those disclose. Such embodiments are understood to fall within the scope of protection of the claims.

What is claimed is:

1. A data storage path switching method, applied to a storage array comprising multiple disks for storing data, and first and second controller nodes, the first controller node having a first switch connected to receive data from a server and transmit data to the multiple disks, and the second controller node having a second switch connected to receive data from the server and transmit data to the multiple disks, wherein the first switch and the second switch are Peripheral Component Interconnect Express (PCIE) switches, the first switch has a first non-transparent bridge (NTB) port, and the second switch has a second NTB port, and the first switch and second switch are connected by a communication link that is formed by connecting the first and second NTB ports, original attribute of the first and second NTB ports are configured to isolate devices at two sides of the first and second NTB ports so that the devices cannot scan and find each other;

the method comprising:
 detecting, by the first controller node by monitoring signals transmitted over the communication link connecting the first and second switches, that the second controller node has failed;

modifying, by the first controller node after detecting that the second controller node has failed, the attribute of the first and second NTB ports by setting the first NTB port as an upstream port, and the second NTB port as a downstream port;

scanning, by the first controller node after modifying the attribute of the NTB ports, the second switch of the second controller node through the upstream port;

resetting, by the first controller node via the communication link after scanning the second switch, the second switch of the second controller node so that the second switch of the second controller node is placed in a PCIE domain of the first controller node and the second switch is reset to redirect data received by the second switch from the server to the first switch of the first controller node via the communication link;

receiving, by the first controller node after resetting the second switch, data redirected by the second switch to the first switch, wherein the data redirected by the second switch is sent by the server to the second controller node for storing in the multiple disks; and sending, by the first controller via the first switch, the data redirected by the second switch to the multiple disks for storage.

2. The method according to claim 1, wherein the step of detecting that the second controller node has failed comprises:

determining, by the first controller node, whether the first switch has received via the communication link a handshake message or a heartbeat message from the second controller node in a preset time period, wherein the first controller node decides that the second controller node has failed when no handshake message or heartbeat message has been received in the preset time period.

3. The method according to claim 1, wherein the step of detecting whether the second controller node has failed comprises:

sending, by the first controller node, a probe message to the second controller node through the communication link connecting the first switch and the second switch;

determining, by the first controller node, whether a response message fed back by the second controller node via the communication link is received in a preset time interval, wherein the first controller node decides that the second controller node has failed when a response message is not received in the preset time interval.

4. The method according to claim 1, wherein the method further comprises:

receiving, by the first controller node, data to be stored from the server; and sending, by the first controller node via the first switch, the data to be stored multiple disks for storage.

5. A storage array comprising:

multiple disks for storing data; and first and second controller nodes, the first controller node having a first switch connected to receive data from a server and transmit data to the multiple disks, and the second controller node having a second switch connected to receive data from the server and transmit data to the multiple disks, wherein the first switch and the second switch are Peripheral Component Interconnect Express (PCIE) switches, the first switch has a first non-transparent bridge (NTB) port, and the second switch has a second NTB port, and the first switch and second switch are connected by a communication link that is formed by connecting the first and second NTB ports, original attribute of the first and second NTB ports are configured to isolate devices at two sides of the first and second NTB ports so that the devices cannot scan and find each other, wherein the first controller node is configured to:

detect that the second controller node has failed by monitoring signals transmitted over the communication link connecting the first and second switches, modify, after detecting that the second controller node has failed, the attribute of the first and second NTB ports by setting the first NTB port as an upstream port, and the second NTB port as a downstream port, scan, after modifying the attribute of the NTB ports, the second switch of the second controller node through the upstream port, reset, via the communication link after scanning the second switch, the second switch of the second controller node so that the second switch of the second controller node is placed in a PCIE domain of the first controller node and that the second switch is reset to redirect data received by the second switch from the server to the first switch of the first controller node via the communication link, receive the data redirected by the second switch to the first switch, wherein the data redirected by the second switch is sent by the server to the second controller node for storing in the multiple disks, and after resetting the second switch, send data redirected to the first switch by second switch to the multiple disks for storage.

6. The storage array according to claim 5, wherein the first controller node is configured to determine whether the first switch has received via the communication link a handshake message or a heartbeat message from the second controller node in a preset time period, and determine that the second controller node has failed when no handshake message or heartbeat message has been received in the preset time period.

7. The storage array according to claim 5, wherein the first controller node is configured to send a probe message to the second controller node through the communication link connecting the first switch and the second switch, determine whether a response message fed back by the second controller node via the communication link is received in a preset time interval, and determine that the second controller node has failed when a response message is not received in the preset time interval.

8. The storage array according to claim 5, wherein the first controller node is configured to receive data to be stored from the server, and send the data to be stored from the server to the multiple disks for storage.

9. The storage array according to claim 5, wherein before the second controller node is determined to be failed, the second controller node is configured to receive data to be stored from the server, and send the data to be stored from the server to the multiple disks for storage.

* * * * *